United States Patent Office 3,119,798
Patented Jan. 28, 1964

3,119,798
PRODUCTION OF SOLID OLEFIN POLYMERS
Charles W. Moberly and Boris Franzus, Bartlesville, Okla., assignors to Phillips Petroleum Company, a corporation of Delaware
No Drawing. Filed Jan. 27, 1960, Ser. No. 4,877
7 Claims. (Cl. 260—93.7)

This invention relates to the production of solid olefin polymers. In one aspect, the invention relates to an improved method for preparing from certain selected olefins solid polymers having a high isotactic content.

Various reactions for polymerizing olefins are described in the literature, and the polymerizations are usually carried out in the presence of catalysts. One type of catalyst which has been recently disclosed for use in the polymerization of monoolefins, particularly ethylene, consists of an organometal compound, e.g., triethylaluminum, and a compound of a heavy metal, e.g., titanium tetrachloride. It has been found that when certain olefins, e.g., propylene, are contacted with such a catalyst, a polymer is obtained which is crystalline and which is characterized by certain regularity of molecular structure. Thus, a polypropylene molecule can be considered as a chain of 2-carbon units with a methyl side group attached to every other carbon atom in the chain. Certain polymers of this type are characterized by the fact that they contain a series of such monomer units in which all of the methyl side groups are oriented in space at the same position or at the same angle with respect to the respective tertiary carbon atoms to which they are attached. The portion of the polymer having this regular structure is highly crystalline and is generally referred to as isotactic polypropylene. The amount of isotactic polypropylene contained in the total polymer product formed in any given polymerization appears to have a significant influence on certain properties of the polymer product, such as hardness, modulus, ultimate tensile strength, range of melting temperatures, and molding and fiber forming properties. The higher the isotactic content of the polymer, the more outstanding are the physical properties of that polymer.

It is an object of this invention, therefore, to provide an improved process for producing isotactic polymers.

Another object of the invention is to provide a process for preparing polymers having isotactic contents which are higher than those of conventionally prepared polymers.

A further object of the invention is to provide a process in which increased yields of isotactic polymers are obtained.

Other and further objects and advantages of the invention will become apparent to those skilled in the art upon consideration of the accompanying disclosure.

The present invention resides in the discovery that certain olefins of very high isotactic content can be prepared if the polymerization is carried out in the presence of a catalyst adjuvant comprising a compound selected from the group consisting of stilbene, substituted stilbenes, acenaphthylene and substituted acenaphthylenes. Broadly speaking, in a process in which an olefin corresponding to the formula R—CH=CH$_2$, wherein R is an alkyl radical containing from 1 to 4 carbon atoms or a phenyl or alkyl-substituted phenyl radical, is polymerized in the presence of a catalyst prepared by admixing (a) a metal, metal hydride or organometal compound of a metal of groups I, II and III of the periodic system and (b) a compound of a metal of group IV, V, VI or VIII of the periodic system, the instant invention resides in the improvement of conducting the polymerization in the presence of compounds having the following structural formulas:

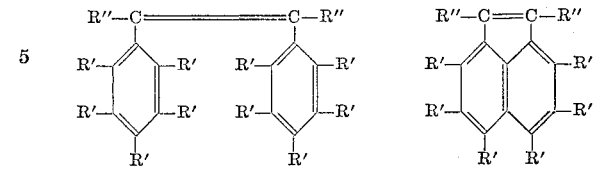

wherein each R' is selected from the group consisting of hydrogen, a halogen, or an alkyl, aryl or cycloalkyl radical, and each R" is selected from the group consisting of hydrogen, an alkyl, cycloalkyl, aryl or alkenyl group. It is to be understood that the R' and R" groups can be the same or they can be different. Also, the R' and R" groups can be a combination of hydrocarbon radicals, e.g., alkaryl or aralkyl. The term "alkenyl group" is intended to cover hydrocarbon substituted alkenyl groups, e.g., cycloalkyl or aryl substituted alkenyl groups. When R" is an alkenyl group, the unsaturation linkage is preferably in the 1-position. The total number of carbon atoms in the R' groups of any particular compound does not exceed 12, whereas the total number of carbon atoms in the R" groups does not exceed 24. The halogens can be chlorine, bromine, iodine or fluorine. Although the stilbene compounds can have either a cis- or trans-structure, the cis-stilbenes are usually the preferred compounds. Examples of suitable compounds include stilbene, 2,2'-dimethylstilbene,
2-methyl-2'-ethylstilbene,
2,2'-dichlorostilbene,
3,7-dimethylacenaphthylene,
4,5-dimethylacenaphthylene,
4,6-dichloroacenaphthylene,
5-chloroacenaphthylene,
2,2'-diphenylstilbene,
4,4'-dicyclohexylstilbene,
3,4'-di-n-hexylstilbene,
2-t-butyl-4'-ethylstilbene,
2-bromostilbene,
2,3'-dichlorostilbene,
4-fluorostilbene,
3-iodostilbene,
4,7-diphenylacenaphthylene,
5-cyclohexylacenaphthylene,
5,6-di-n-hexylacenaphthylene,
3-t-butyl-5-methylacenaphthylene,
3,5-dibromoacenaphthylene,
4,5-diiodoacenaphthylene,
5-fluoroacenaphthylene,
4-iodoacenaphthylene,
α-methylstilbene,
α,α'-dimethylstilbene,
α-ethylstilbene,
α,α'-diethylstilbene,
1,2-diphenyl-1,3-butadiene,
3,4-diphenyl-1,3,5-hexatriene,
1,2,3,4-tetraphenyl-1,3-butadiene,
α,α'-didodecylstilbene,
α-dodecylstilbene,
α,α'-dieicosylstilbene,
α-(1-eicosenyl)stilbene,
α,α'-di(1-eicosenyl)stilbene,
α-(1,2-diphenyl-1-dodecenyl)stilbene,
α,α'-di(1,2-diphenyl-1-octenyl)stilbene,
1-methylacenaphthylene,
1,2-diethylacenaphthylene, 1,2-divinylacenaphthylene,
1-(1,2-diphenylvinyl)acenaphthylene,
1,2-(1,2-diphenylvinyl)acenaphthylene,
1-eicosenylacenaphthylene,
1,2-dieicosenylacenaphthylene,
1,2-di-(1,2-diphenyl-1-dodecenyl)acenaphthylene,
1-(1,2-diphenyl-1-octenyl)acenaphthylene,
α-(1-methyl-1-propenyl)stilbene,
α,α'-(1-methyl-1-propenyl)stilbene,
α,α'-di(1-methyl-1-hexenyl)stilbene,
α,α'-di(1,2-dicyclohexylvinyl)stilbene,
α-(5-eicosenyl)stilbene,
α,α'-di(19-eicosenyl)stilbene,
α-(1,3-dimethyl-1-butenyl)stilbene,
1-(1-methyl-1-propenyl)acenaphthylene,
1,2-(1-methyl-1-propenyl)acenaphthylene,
1,2-(1,2-dicyclohexylvinyl)acenaphthylene,
1-(4-eicosenyl)acenaphthylene,
1-(19-eicosenyl)acenaphthylene,
1-isopropenyl-2-methylacenaphthylene,
and the like.

When proceeding in accordance with the present invention, it has been found that polymers having isotactic contents in the range of 84 to 90 percent and higher can be readily prepared. In comparison, if the polymerization is conducted in the absence of the adjuvant of this invention with a catalyst comprising, e.g., titanium trichloride and triethylaluminum, the isotactic content of the polymer is usually around 80 percent. Furthermore, it has been found that the addition of the adjuvant material of this invention to catalyst systems which normally produce polymers of very low isotactic contents results in a substantial increase in the isotactic content of the product produced. For example, when using a catalyst system consisting of titanium tetrachloride and a trialkylaluminum, such as triisobutylaluminum, to polymerize propylene, a polymer having an isotactic content of about 20 percent is generally obtained. By incorporating a stilbene or an acenaphthylene in such a catalyst system, it has been found that the isotactic content of the product produced can be increased to 50 percent or higher. The reason for the unexpected improvement obtained when utilizing the stilbenes and acenaphthylenes in the process of this invention is not completely understood. However, it is apparent that the additive materials act to modify the action of the catalyst system so that the polymer product is one having a high isotactic content. In general, the addition of the stilbenes and acenaphthylenes to the polymerization system as herein described makes it possible to obtain a polymer product having a higher isotactic content than that obtainable in the absence of such compounds.

The olefins which are polymerized in accordance with the present process correspond to the formula $$R-CH=CH_2$$

wherein R is selected from the group consisting of an alkyl radical containing from 1 to 4, inclusive, carbon atoms, a phenyl radical and an alkyl-substituted phenyl radical. The total number of carbon atoms in the alkyl group substituted on the phenyl radical preferably does not exceed 6 carbon atoms. Examples of suitable olefins include propylene, 1-butene, 1-pentene, 2-methyl-1-butene, 2-methyl-1-pentene, 4-methyl-1-pentene, 3,3-dimethyl-1-butene, styrene, 2-methylstyrene, 4-methylstyrene, 3-ethylstyrene, 3-ethyl-4-methylstyrene, 3,4-diethylstyrene, 2,4-di-n-propylstyrene, 2,4-diethylstyrene, and the like. It is often preferred to utilize propylene as the monomer.

The polymerization process of this invention is conducted in the presence of a two or more component catalyst system wherein one component is an organometal compound, including compounds where one or more, but not all organo groups are replaced by halogen, a metal hydride, or a metal of Groups I, II or III, and the second component is a Group IV, V, VI or VIII (Mendeleef's Periodic System) metal compound. The organometal compounds referred to include, without limitation, alkyl, cycloalkyl or aryl compounds of mono-, di-, or trivalent metals, particularly aluminum, gallium, indium, beryllium, sodium, potassium, lithium, rubidium, cesium, magnesium, cadmium, mercury, zinc, barium, or such organometal compounds where one or more but not all, of the alkyl, cycloalkyl, or aryl groups is replaced by a hydrogen atom and/or a halogen atom. The organo groups can be quite large, compounds being applicable which have 15 or more carbon atoms in each alkyl, cycloalkyl or aryl group, and 40 carbon atoms or more in the molecule. Specific examples of such organometal compounds include triethylaluminum, triisobutylaluminum, a mixture of diethylaluminum chloride and ethylaluminum dichloride, sometimes referred to as ethylaluminum sesquichloride, diethylaluminum hydride, ethylaluminum dichloride, or diethylaluminum chloride, taken alone, trioctylaluminum, tridodecylaluminum, triphenylaluminum, triphenylgallium, diphenylberyllium, dicyclohexylberyllium, cyclohexylzinc fluoride, and $CH_3AlCl_2$, $(CH_3)_2AlCl$, $(C_4H_9)_2AlBr$, $C_8H_{17}AlI_2$, $(C_3H_7)_2GaF$, $(C_6H_{11})_2GaCl$ (cyclohexane derivative), $C_6H_5GaBr_2$, $C_{20}H_{41}GaBr_2$, $(C_{14}H_{29})_2GaF$, $(C_6H_5)_2InCl$, $C_8H_{17}InF_2$, $C_6H_{11}InBr_2$ (cyclohexane derivative), $C_{17}H_{35}BeI$, $CH_3BeBr$, and the like.

The metal hydrides can include, as specific examples, aluminum hydride, lithium aluminum hydride, barium hydride, gallium hydride, indium hydride, sodium aluminum hydride, and potassium beryllium hydride.

The metals of Groups I, II and III are applicable as a class, the most important members being sodium, magnesium and aluminum.

The compounds of the metals of Groups IV, V, VI and VIII of the Periodic System include the oxides, hydrides, halides, oxyhalides, and salts of organic acids, usually having 20 or less carbon atoms, such as formic acid. It is usually preferred to employ compounds of titanium, zirconium, hafnium, chromium, thorium, molybdenum, vanadium, niobium, tantalum, and iridium. Of the various compounds, it is generally preferred to employ the titanium halides, including the chlorides, fluorides, bromides and iodides, particularly the tri- and tetrachlorides, the tri- and tetrabromides, and the tri- and tetraiodides of titanium.

A third catalyst component which can be advantageously used is an organic halide or metal halide where the organic radical has 30 or less carbon atoms and is an alkyl, cycloalkyl or aryl group. Specific examples include ethyl bromide, ethyl trichloro titanium, bromobenzene, cyclohexyl chloride, and the like. Also applicable as third catalyst components are the alkali metal and ammonium halides, and aluminum halides (where the catalyst also includes another metal compounds such as a titanium compound), a halogen, a hydrogen halide, an organophosphorus-containing compound, and a peroxide.

Examples of suitable catalyst systems in accordance with the foregoing disclosure are as follows:

(a) Aluminum trialkyls, e.g., triethylaluminum or triisobutylaluminum, and the tri- or tetravalent metal halides of Groups IV-A and V-A of the type represented by the tri- and tetrachlorides, the tri- and tetrabromides and the tri- and tetraiodides of titanium, zirconium, hafnium, vanadium, niobium and tantalum;

(b) An organic halide, such as ethyl bromide a Group IV inorganic halide, such as titanium tetrachloride, and a low valence metal selected from the group consisting of alkali metals, beryllium, magnesium, zinc, cadmium, mercury, aluminum, gallium, indium and thallium, for example, magnesium, ethyl bromide and titanium tetrachloride, as such, or with the addition of metallic aluminum;

(c) A Group IV metal halide, for example, titanium tetrachloride, and a metal identified in (b), for example, sodium, aluminum or magnesium;

(d) A mixture of titanium hydride and an organometal compound exemplified by an aluminum alkyl halide, i.e., a mixture of titanium hydride and ethylaluminum sesquichloride;

(e) Titanium dioxide and an organometal compound such as trialkylaluminum or aluminum alkyl chlorides, e.g., a mixture of titanium dioxide and ethylaluminum sesquichloride;

(f) A mixture of molybdenum pentachloride and organometal compounds exemplified by triisobutylaluminum or triethylaluminum and ethylaluminum dichloride;

(g) A mixture of complex metal halides, exemplified by potassium fluotitanate, and an organometal compound exemplified by triethylaluminum and diethylaluminum chloride;

(h) A mixture of a derivative selected from the oxides of molybdenum, alkali metal and ammonium molybdate, and an organometal compound exemplified by triisobutylaluminum and isobutylaluminum dichloride;

(i) A mixture of a derivative of iridium, platinum, and osmium, selected from the group consisting of halides or oxides, and complex compounds of iridium, platinum and osmium, the complex compounds corresponding to the formula $M_xM'X_y$, wherein M is an alkali metal or an ammonium radical, M' is iridium, platinum or osmium, X is a halogen, and $y$ is at least one and the sum of $x$ and $y$ is equal to the valence of M', and a metallic organic compound exemplified by triethylaluminum, for example, iridium chloride and triethylaluminum or ethylaluminum sesquichloride;

(j) At least one derivative selected from the group consisting of oxides, halides, and oxyhalides of vanadium and complex salts of said halides with a member selected from the group consisting of ammonium halide and an alkali metal halide, and an organometal compound exemplified by triethylaluminum, for example, vanadium oxide or vanadium chloride and triethylaluminum;

(k) A mixture of a derivative of a Group VI metal selected from the group consisting of halides, oxyhalides, hydroxyhalides, oxyhydroxyhalides of a metal selected from the group consisting of molybdenum, tungsten, uranium, selenium, tellurium, and polonium, and complex salts of said halides and said oxyhalides with a member selected from the group consisting of halides of sodium, potassium, lithium, rubidium, cesium, and ammonia and an organometal compound exemplified by triethylaluminum, for example, molybdenum pentachloride and ethylaluminum dichloride;

(l) A chromyl halide and at least one of the following (1) a metal hydride or an organometal compound, and (2) a mixture of an organic halide and a metal, for example, chromyl chloride, ethyl bromide and magnesium;

(m) At least one halide of titanium, zirconium or hafnium, and at least one hydride of lithium, sodium, potassium, rubidium, cesium, magnesium, calcium, strontium, barium, lanthanum, or thorium, for example, zirconium tetrachloride and calcium hydride;

(n) (1) a hydrocarbon derivative of one of the metals zinc, cadmium, mercury, and magnesium, and (2) a member selected from the group consisting of halides of titanium, zirconium, vanadium, and molybdenum, oxyhalides of titanium, zirconium, vanadium, molybdenum and chromium, and complex salts of said halides and oxyhalides with a member selected from the group consisting of halides of the alkali metals and ammonia, for example, diethylzinc and titanium tetrachloride;

(o) (1) A tri- or tetrahalide of titanium, zirconium, hafnium and germanium, (2) an organophosphorus-containing compound, and (3) at least one of the following, (a) an organometal compound, (b) a mixture of an organic halide and a metal, and (c) a complex hydride, for example, triethylaluminum, titanium tetrachloride and triphenylphosphine;

(p) (1) A tri- or tetrahalide of titanium, zirconium, hafnium or germanium, (2) a peroxide of the formula R'''OOR''' wherein R''' is hydrogen, alkyl, aralkyl, alkaryl, cycloalkyl, acyl, alkyne, or aryl, and (3) at least one of the following: (a) an organometal compound, (b) a mixture of an organic halide and a metal, and (c) a complex hydride, for example, ethylaluminum sesquichloride, titanium tetrachloride and benzoyl peroxide;

(q) (1) A halide of titanium, zirconium, hafnium, or germanium, (2) a hydride selected from the group consisting of hydrides of aluminum, gallium, indium, and thallium, and complexes of said hydrides with alkali metal hydrides, and (3) an organic halide, for example, titanium tetrachloride, lithium aluminum hydride and ethyl bromide.

The ratio of the catalyst components employed in the present process can be varied rather widely, depending upon the particular monomer used and the operating conditions. The mol ratio of the organometal compound, metal hydride or Groups I, II or III metal to the Group IV, V, VI, or VIII metal compound is usually in the range of 1:1 to 10:1 with a preferred range being 2:1 and 5:1. The concentration of catalyst in the polymerization zone is usually in the range of 0.01 to 5 weight percent, based on the monomer charged to that zone, although lesser or greater amounts can be used. The adjuvants of the invention are incorporated in the catalyst composition in a ratio of 0.01 to 4.0 mols per mol of the Group IV, V, VI or VIII metal compound Addition of the additive material can be made at any point in the preparation of the catalyst. A convenient method of operation is to add the adjuvant along with the diluent in the initial charge to the reactor.

The process of this invention can be carried out in the presence or absence of a diluent. However, it is often preferred to conduct the process in the presence of a hydrocarbon diluent which is relatively inert and liquid under the conditions of the process and does not have a deleterious effect on the catalyst. Suitable diluents include paraffinic, cycloparaffinic and/or aromatic hydrocarbons. Examples of such diluents include propane, butane, pentane, hexane, cyclohexane, methylcyclohexane, benzene, toluene, the xylenes, and the like. The relative amounts of diluent and olefin employed in the polymerization depend upon the particular conditions and techniques used and are generally governed by the capacity of the apparatus to effect suitable agitation and heat removal. In general, the total olefin content of the feed mixture charged to the polymerization reactor is in the range of 0.5 to 25 weight percent of the diluent present in the reactor.

The polymerization can be carried out at a temperature varying over a rather broad range, for example, at a temperature from 100 to 500° F. However, it is usually preferred to conduct the polymerization at a temperature in the range of 150 to 350° F. The pressure employed in the process can range from atmospheric and below to about 30,000 p.s.i.g. and higher, with a preferred range being between 50 and 1500 p.s.i.g. In general, pressures are satisfactory which are sufficient to maintain the reaction mixture substantially in the liquid phase. However, when operating in the absence of a diluent, the pressures and temperature can be such that the olefin to be polymerized remains in the vapor phase.

It has been found that various materials in some instances may have a tendency to inactivate the catalyst composition of this invention. These materials include carbon dioxide, oxygen and water. Accordingly, it is usually desirable to free the olefins to be polymerized from these materials as well as from other materials which may tend to inactivate the catalyst before contacting the olefin with the catalyst. Any of the known means for removing such contaminants can be employed. Furthermore, the hydrocarbon diluent employed in the process is preferably freed of contaminants, such as water, oxygen and the like. It is desirable also that air and moisture be removed from the reaction vessel before the reaction is carried out. This is usually accomplished by purging with an inert gas such as nitrogen. In some cases, small amounts of catalyst inactivating materials, such as oxygen and water, can be tolerated in the reaction mixture while still obtaining reasonably good polymerization rates. However, it is to be understood that the amount of such materials present in the reaction mixture shall not be sufficient to completely inactivate the catalyst.

The process of this invention can be carried out as a batch process by pressuring the olefin to be polymerized into a reactor containing the catalyst, the adjuvant and the diluent. In one method of procedure, the diluent is charged to a dry reactor, the system being swept with nitrogen or other inert gas during the charging. The catalyst is then added to the reactor while stirring after which the adjuvant is added and the reactor is closed. Before charging the olefin to be polymerized, it is usually desirable to purge the reactor with a portion of the monomer. The monomer is then vented after which the initial monomer charge is introduced and the temperature is raised until polymerization is initiated. The temperature is then maintained in the desired range by heating or by cooling as is necessary. It is frequently found to be desirable to add the monomer in increments during the polymerization, the amounts added being sufficient to maintain the pressure at a substantially constant level. While it is often preferred to operate in accordance with the aforementioned procedure it is to be understood that it is not intended to limit the invention to any particular method of operation. Furthermore, the process can be carried out continuously by maintaining the above-described concentrations of reactants in the reactor for a suitable residence time. The residence time used in a continuous process can vary widely since it depends to a great extent upon the temperature at which the process is carried out and upon the specific olefin that is to be polymerized. However, the residence time in a continuous process generally falls within the range of 1 second to 5 hours or more. In a batch process the reaction time can also vary widely, such as from 15 minutes up to 24 hours or more.

Upon completion of the polymerization, any excess olefin is vented and the contents of the reactor are then treated by any suitable method to inactivate the catalyst and remove the catalyst residues. In one method, inactivation of the catalyst is accomplished by washing with an alcohol, water or other suitable material. In some cases, the catalyst inactivating treatment also removes a major proportion of the catalyst residues while in other cases it may be necessary to treat the polymer with an acid, a base or other suitable material to effect the desired removal of the catalyst residues. The treatment of the polymer may be carried out in a comminution zone, such as a Waring Blendor, so that a finely divided polymer is thereby provided. The polymer is then separated from the diluent, e.g., by decantation, filtration or other suitable method, after which the polymer is dried. The diluent and treating agents can be separated by any suitable means, e.g., by fractional distillation, and reused in the process.

A more complete understanding of the invention can be obtained by referring to the following illustrative example which is not intended, however, to be unduly limitative of the invention.

EXAMPLE

A series of runs was carried out in which the following procedure was followed in polymerizing propylene. A 1-gallon stainless steel reactor, previously purged with nitrogen, was charged with 1 liter of cyclohexane. The cyclohexane contained a weighed amount of titanium trichloride and the adjuvant to be tested. The reactor was then closed and flushed twice with nitrogen. A solution of triethylaluminum in 500 ml. of cyclohexane was then charged to the reactor through the charging tube, this charge being followed by an additional 500 ml. of cyclohexane as a rinse. The reactor was then flushed twice at 100 p.s.i.g. with propylene, and the reactor stirrer was started. Thereafter, 0.6 pounds (272 grams) of propylene was introduced into the reactor. The reactor was then heated to a temperature of about 225° F. in order to initiate the reaction. The temperature was maintained in the range of 225 to 260° F. during the runs, with additional propylene being added after about 1.5 hours. The pressure was maintained at about 150 p.s.i.g., and at the end of 2.5 hours the propylene feed was shut off. The stirrer was then stopped, and the reactor was allowed to cool overnight.

The contents of the reactor were removed and washed in a Waring Blendor with about 3 liters of isopropyl alcohol. Thereafter, the polymer was removed and washed in about 3 liters of methanol. The polymer was then recovered, sprayed with about 0.1 percent Ionol (2,4-di-t-butyl-4-methylphenol) and dried overnight in a vacuum oven at 80° C.

The isotactic content of the products was determined by placing 2.5±0.1 grams of polymer in a weighed extraction thimble and extracting in an ASTM rubber extraction apparatus for 2.5 hours with 100 ml. of normal heptane. The thimble was then removed and dried in a forced air oven at 110° C. for 2 hours after which it was cooled in a desiccator and weighed. The weight percent of residue based on original polymer was calculated and recorded as the isotactic content of the polymer.

Data for the runs are shown hereinbelow in the table. Included in the table are data for control runs which were carried out in the absence of the adjuvant of this invention.

*Table*

| Control Runs | 1 | 2 | 3 | 4 |
|---|---|---|---|---|
| TEA, gm | 1.29 | 1.31 | 1.52 | 1.49 |
| $TiCl_3$, gm | 0.586 | 0.594 | 0.689 | 0.676 |
| Mol Ratio Catalyst, TEA/$TiCl_3$/Adj | 3.0/1/0 | 3.0/1/0 | 3.0/1/0 | 3.0/1/0 |
| Yield, gm | 494 | 435 | 531 | 651 |
| Productivity, g./g. cat | 269 | 228 | 240 | 300 |
| Isotactic Content, Percent | 78.5 | 80.5 | 80.0 | 78.7 |

| Run No | 5 | 6 | 7 | 8 | 9 | 10 | 11 |
|---|---|---|---|---|---|---|---|
| TEA, gm | 1.35 | 1.32 | 1.31 | 1.29 | 1.26 | 1.47 | 0.661 |
| $TiCl_3$, gm | 0.623 | 0.600 | 0.605 | 0.591 | 0.567 | 0.660 | 0.300 |
| Acenaphthylene, gm | | 0.274 | 0.597 | 1.162 | 2.24 | | |
| cis-Stilbene, gm | 0.363 | | | | | | |
| cis-α-ethylstilbene | | | | | | 0.89 | |
| 1,2,3,4-tetraphenyl-1,3-butadiene | | | | | | | 0.331 |
| Mol Ratio Catalyst, TEA/$TiCl_3$/Adjuvant | 2.9/1/0.5 | 3.0/1/0.46 | 3.0/1/1.0 | 3.0/1/1.87 | 3.0/1/4.0 | 3/1/1 | 3/1/0.4+ |
| Yield, gm | 471 | 382 | 382 | 400 | 353 | 562 | 171 |
| Productivity, g./g. cat | 239 | 199 | 199 | 213 | 193 | 264 | 178 |
| Isotactic Content, Percent | 85.0 | 84.0 | 88.0 | 90.5 | 85.0 | 87.9 | 85.8 |

From a consideration of the data in the foregoing table, it is seen that in the runs conducted according to the present invention, polypropylene products were obtained which had isotactic contents ranging from 84 percent to 90 percent and higher. These runs are to be compared with the control runs in which the products had an isotactic content ranging from 78.5 to 80.5 percent.

The polymers produced in accordance with this invention have utility in applications where solid plastics are used. They can be molded to form articles of any desired shaped such as bottles or other types of containers. Furthermore, they can be formed into sheets, film or pipe by extrusion or other suitable method.

It will be apparent to those skilled in the art that many variations and modifications of the invention can be practiced upon study of the foregoing disclosure. Such variations and modifications are believed to come within the spirit and scope of the invention.

We claim:

1. In a process for polymerizing propylene in which said propylene is contacted with a catalyst consisting essentially of a mixture prepared by admixing trialkylaluminum and a titanium halide in the presence of a hydrocarbon diluent at a temperature in the range of 100 to 350° F. and at a pressure in the range of 50 to 1500 p.s.i.g., the improvement which comprises conducting said contacting in the presence of an adjuvant compound selected from the group consisting of compounds having the following structural formulas:

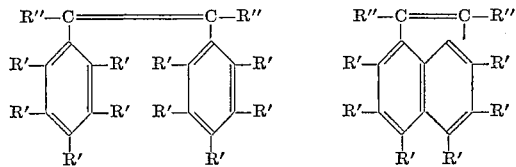

wherein each R' is selected from the group consisting of hydrogen, a halogen, alkyl, aryl and cycloalkyl, the total number of carbon atoms in said R' groups being in the range of 1 to 12, inclusive, and wherein each R" is selected from the group consisting of hydrogen, alkyl, aryl, cycloalkyl and alkenyl, the total number of carbon atoms in said R" groups being in the range of 1 to 24, inclusive.

2. The process according to claim 1 in which said catalyst consists essentially of a mixture prepared by admitting triethylaluminum and titanium trichloride and said adjuvant compound is stilbene.

3. The process according to claim 1 in which said catalyst consists essentially of a mixture prepared by admixing triethylaluminum and titanium trichloride and said adjuvant compound is acenaphthylene.

4. In a process for polymerizing an olefin in the presence of a catalyst prepared by admixing at least two essential components, one of said components being a metal componud selected from the group consisting of Groups IV, V, VI and VIII metal compounds and another of said components being selected from the group consisting of organometal compounds, metal hydrides and metals of Groups I, II and III, the improvement which comprises contacting said catalyst with an olefin corresponding to the formula R—CH=CH$_2$, wherein R is selected from the group consisting of an alkyl radical containing from 1 to 4, inclusive, carbon atoms, a phenyl radical, and an alkyl-substituted phenyl radical, the total number of carbon atoms in said substituted alkyl groups being in the range of 1 to 6, inclusive, said contacting occurring in the presence of acenaphthylene.

5. In a process for polymerizing an olefin in the presence of a catalyst prepared by admixing at least two essential components, one of said components being a metal compound selected from the group consisting of Groups IV, V, VI and VIII metal compounds and another of said components being selected from the group consisting of organometal compounds, metal hydrides and metals of Groups I, II and III, the improvement which comprises contacting said catalyst with an olefin corresponding to the formula R—CH=CH$_2$, wherein R is selected from the group consisting of an alkyl radical containing from 1 to 4, inclusive, carbon atoms, a phenyl radical, and an alkyl-substituted phenyl radical, the total number of carbon atoms in said substituted alkyl groups being in the range of 1 to 6, inclusive, said contacting occurring in the presence of 2,2'-dimethylstilbene.

6. In a process for polymerizing an olefin in the presence of a catalyst prepared by admixing at least two essential components, one of said components being a metal compound selected from the group consisting of Groups IV, V, VI and VIII metal compounds and another of said components being selected from the group consisting of organometal compounds, metal hydrides and metals of Groups I, II and III, the improvement which comprises contacting said catalyst with an olefin corresponding to the formula R—CH=CH$_2$, wherein R is selected from the group consisting of an alkyl radical containing from 1 to 4, inclusive, carbon atoms, a phenyl radical, and an alkyl-substituted phenyl radical, the total number of carbon atoms in said substituted alkyl groups being in the range of 1 to 6, inclusive, said contacting occurring in the presence of 2,2'-dichlorostilbene.

7. In a process for polymerizing an olefin in the presence of a catalyst prepared by admixing at least two essential components, one of said components being a metal compound selected from the group consisting of Groups IV, V, VI and VIII metal compounds and another of said components being selected from the group consisting of organometal compounds, metal hydrides and metals of Groups I, II and III, the improvement which comprises contacting said catalyst with an olefin corresponding to the formula R—CH=CH$_2$, wherein R is selected from the group consisting of an alkyl radical containing from 1 to 4, inclusive, carbon atoms, a phenyl radical, and an alkyl-substituted phenyl radical, the total number of carbon atoms in said substituted alkyl groups being in the range of 1 to 6, inclusive, said contacting occurring in the presence of 2,7-dimethylacenaphthylene.

References Cited in the file of this patent

UNITED STATES PATENTS 2,879,263     Anderson et al. _____ Mar. 24, 1959

FOREIGN PATENTS 1,171,450     France _____ Oct. 6, 1958